United States Patent [19]
Bock et al.

[11] Patent Number: 5,381,156
[45] Date of Patent: Jan. 10, 1995

[54] MULTIPLE TARGET DOPPLER TRACKER

[75] Inventors: Ditmar H. Bock, Hamburg; Marjorie A. Rude, Cheektowaga; Frederick W. Kiefer, Williamsville, all of N.Y.

[73] Assignee: Calspan Corporation, Buffalo, N.Y.

[21] Appl. No.: 47,824

[22] Filed: Apr. 15, 1993

[51] Int. Cl.⁶ .............................................. G01S 13/72
[52] U.S. Cl. ........................................ 342/126; 342/66; 342/99; 342/59
[58] Field of Search ............... 342/126, 59, 52, 66, 342/99

[56] References Cited

U.S. PATENT DOCUMENTS

| | | | |
|---|---|---|---|
| 3,286,263 | 11/1966 | Hammack | 342/463 X |
| 3,324,468 | 6/1967 | Krepper | 342/59 |
| 3,992,708 | 11/1976 | Olson et al. | 342/52 X |
| 4,499,468 | 2/1985 | Montona et al. | 342/463 X |
| 4,751,511 | 6/1988 | Komata et al. | 342/59 |
| 4,806,936 | 2/1989 | Williams et al. | 342/126 |
| 4,994,809 | 2/1991 | Yung et al. | 342/108 |
| 5,138,322 | 8/1992 | Nuttall | 342/126 |

*Primary Examiner*—Gilberto Barrón, Jr.
*Attorney, Agent, or Firm*—Biebel & French

[57] ABSTRACT

The present invention is a Multiple Target Doppler Tracker which tracks a plurality of components, including debris and submunitions of a munition burst apart above the ground. A plurality of transmitters transmits constant frequency (CW) signals towards the burst event of the munition and a plurality of receivers receive the signals reflected from the components. The signals received by the receivers are processed into frequency spectra. The spectra are analyzed to determine the path of a selected number of components. Using the path information the selected components are tracked with tracking devices.

7 Claims, 5 Drawing Sheets

MULTIPLE TARGET DOPPLER TRACKER

BACKGROUND OF THE INVENTION

The present invention relates to a system of tracking a multiple of components and more specifically to the tracking of debris and submunitions of a munition which bursts apart above the ground.

In testing munitions, particularly air burst munitions, it is desirable to track each major component of the munition from the time it enters the target area, through the burst event, and its descent to the ground. It is particularly desirable to track each component in real time so that information can be used to control the tracking of an optical telescope fitted with a recording device, such as a television or a film camera to track and capture the deployment of the munition components in the first few seconds.

Prior art tracking systems have been developed using doppler radar with the assistance of a trained analyst. It is desirable, on the other hand, to provide a system that requires no human intervention during the event.

SUMMARY OF THE INVENTION

The present invention provides a means for accurately tracking a Plurality of components from a munition burst for the tracking of the debris and submunitions of the munition burst.

The present invention utilizes a plurality of transmitters and receivers to track the multiple components. Each transmitter is placed in spaced apart predetermined locations surrounding the munition burst event. Each receiver is placed at predetermined location. The receivers receive the signals from the transmitters reflected by the components and produce representative signals of the position and movement of the components.

Using the Doppler effect, a processor receives the signals from the receivers and processes the signals to determined the position of the components and tracks a selected group of the components. The processor produces tracking signals for tracking the components. These tracking signals are used by several tracking devices, such as cameras, to view the selected group of components as they are dispersed by an explosion.

In the past it was assumed that any combination of the Doppler lines observed at the various receivers would require at least N cubed calculations where, N equals the number of Doppler lines in order to determine position in three coordinates. Whereas the present invention performs the necessary calculation as one calculation for every Doppler line.

An object of the present invention is to provide a tracking means for tracking the multiple components for analyzing the consequences of a munition burst.

A further object of the present invention is to provide a means for locating the multiple components after a munition burst.

Other objects and advantages of the present invention will be apparent from the following description, the accompanying drawings, and the appended claims.

DETAILED DESCRIPTION OF THE PRESENT INVENTION

Figure 1:
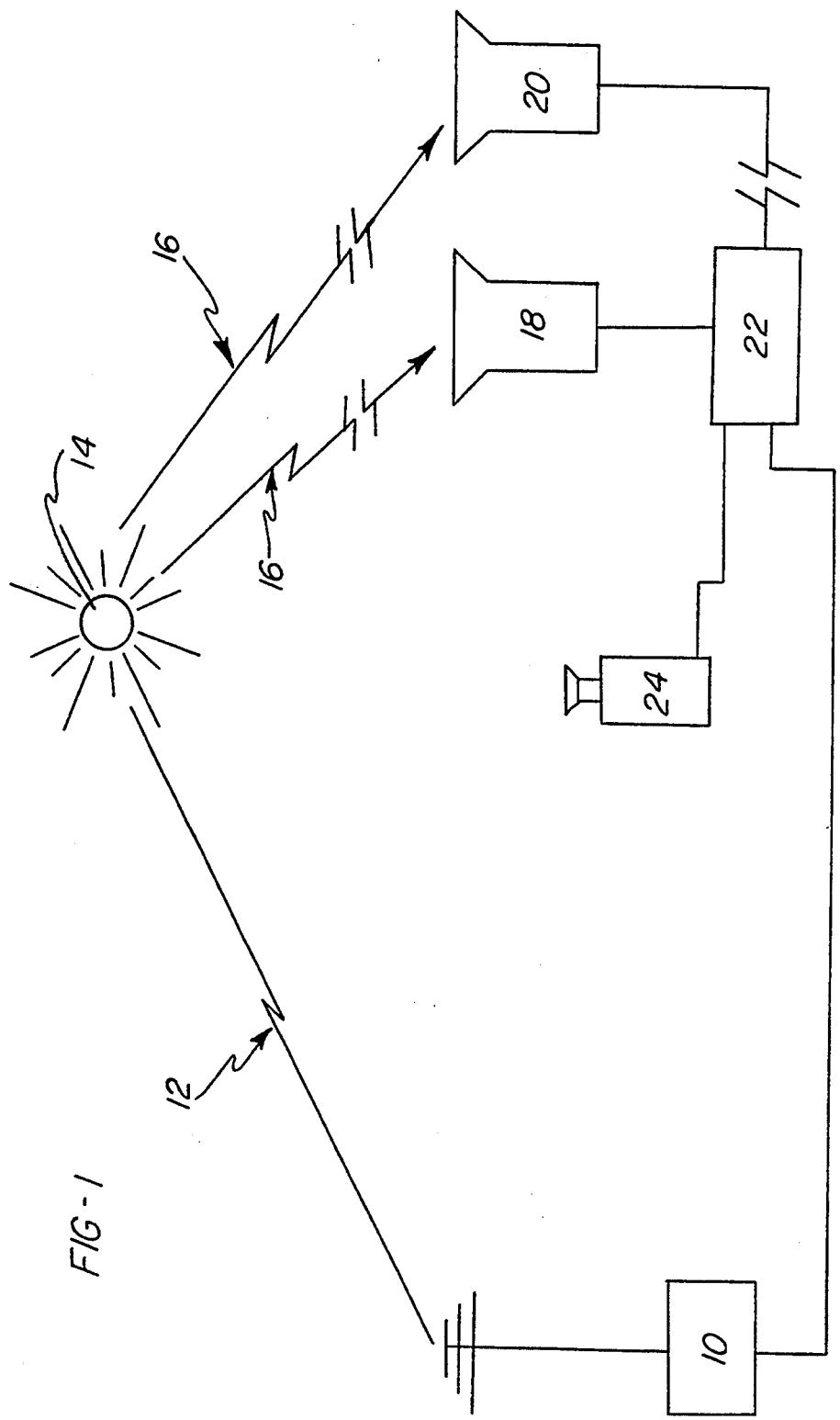
FIG. 1 is a block diagram of the apparatus of the present invention.

Referring to the drawings, there is generally shown the apparatus of one array of the present invention in FIG. 1. The transmitter 10 transmits a signal at a frequency preferably between 2 GHz and 140 GHz towards the burst event location of a munition. The transmitter can transmit at any frequency, but preferably transmits at a frequency of 2.5 GHz. More components can be track at a higher frequency, for example at 140 GHz, which is a high absorption radar frequency. At 140 GHz it is possible to determine the position of 1,100 components. Therefore, it is preferred that a high frequency be used in order to observe the components from the burst of a munition.

The signal 12 transmitted from the transmitter 10 is reflected by a component 14, which is one of several components from the bursting of the munition. A signal 16 is reflected by the component 14 and received by proximal 18 and distal 20 receivers.

Each proximal 18 and distal receiver 20 produces a proximal or distal signal representative of the reflected signal 16 by the component 14. These representative signals are fed into a processor/computer 22.

The processor 22 processes the proximal and distal signals from the proximal 18 and distal 20 receivers using the Doppler effect to determine the position of the component 14. By analyzing the proximal and distal signals, the processor 22 can determine the path of the component 14 for tracking.

The processor 22 produces tracking signals, one for each tracked component, representative of the movement of the component 14. The tracking signals are fed to a plurality of tracking devices 24, one for each component to be tracked. The tracking devices 24 can be a video device, such as an optical kinetic tracking mount (KTM).

Figure 2:
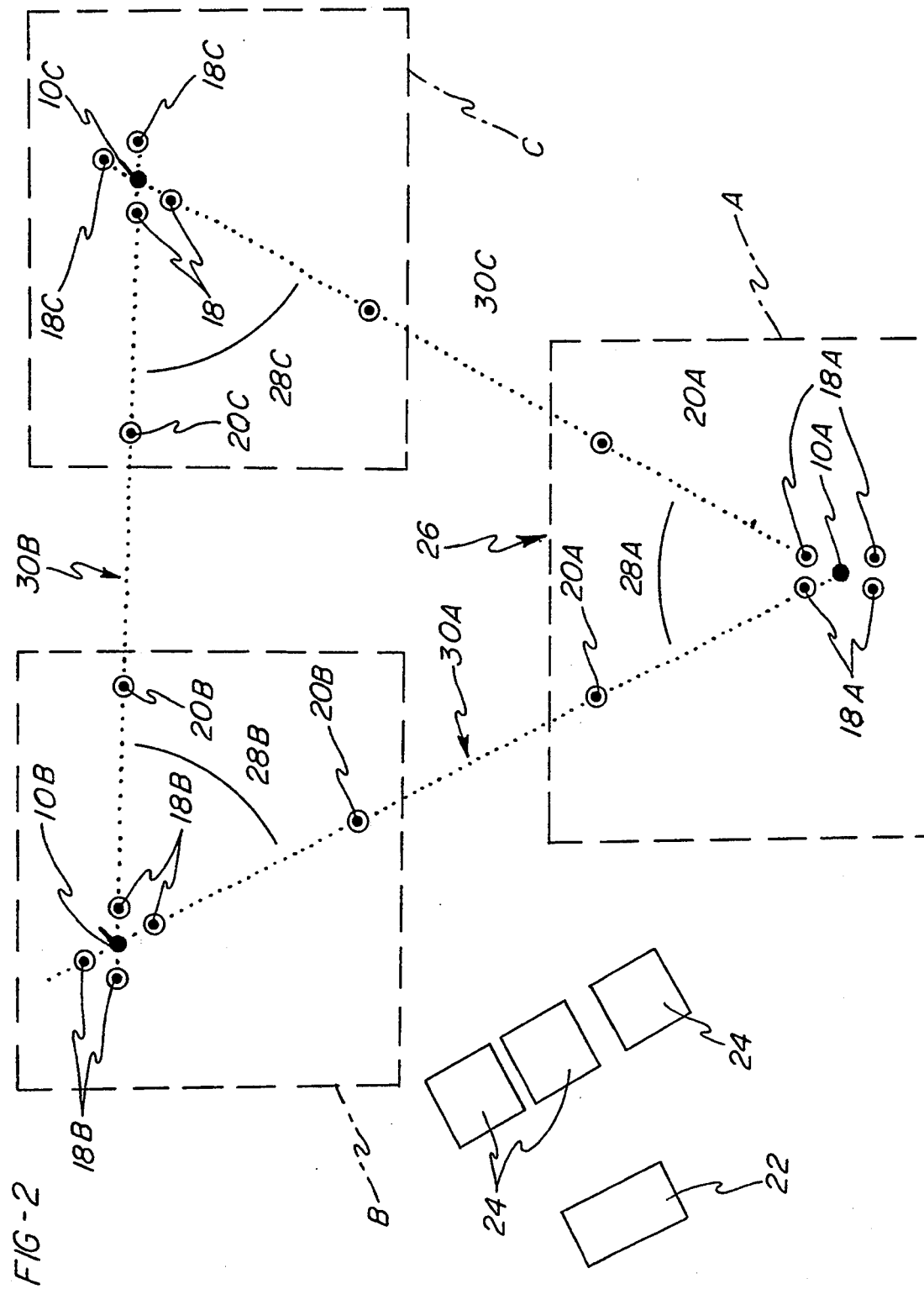
FIG. 2 is a top view of the array of the transmitters and receivers arranged according to the present invention.

Now referring to FIG. 2, there is shown a plurality of arrays for tracking the multiple components of a burst event. As shown there are three arrays, array A, array B, and array C in the preferred embodiment. As stated above, each array A, B and C has a transmitter 10 and proximal 18 and distal 20 receivers. Each of the arrays A, B, and C are placed at predetermined locations around the burst event 26 of a munition. Each of the arrays A, B, and C is controlled by a single processor/computer 22 (FIG. 1). The arrays may be placed some distance apart to assure survival of the data in the event a mission is misdirected.

In the preferred embodiment of the present invention the arrays A, B, and C of the transmitters and receivers are set up in a triangle as shown in FIG. 2. Preferably, each of the transmitters 10 are placed approximately equidistant from each other, thereby forming an equilateral triangle. Each pair of transmitters 10 defines a side 30 of the triangle.

Transmitters 10A and 10B define a first plane 30A and transmitters 10B and 10C define a second plane 30B and finally transmitters 10C and 10A define a third plane 30C. The angle 28 between each plane 30 is preferably 60°. The frequency transmitted by each transmitter 10 is slightly different so that the associated receivers will only receive the reflected signal from its associated transmitter.

For purposes of clarity, array A will be discussed hereafter, and it should be noted that each array A, B, and C, are virtually identical. The plurality of proximal 18A receivers are located around the transmitter 10A. The transmitter 10A has two pairs of proximal receivers, 18A1 and 18A2, located around it. The pairs of proximal receivers 18A1 and 18A2 are positioned equidistant from the transmitter 10A with the first pair of proximal receivers 18A1 lying in plane 30A, one on each side of the transmitter 10A, and the second pair of proximal receivers 18A2 lying in plane 30C, one on each side of the transmitter 10A. Each proximal receiver 18A is located on each side of the transmitter 10A along the planes 30A or 30C.

Similarly, the proximal receivers 18B and 18C are located around the transmitters 10B and 10C, each pair lying along planes 30A, 30B or 30C equal distance from their respective transmitter 10B or 10C and on each side of the transmitter 10B or 10C.

A plurality of distal receivers 20A, 20B and 20C lie along planes 30A, 30B and 30C less than half-way between their respective transmitter 10A, 10B or 10C and the correlating transmitter 10B, 10C or 10A.

The arrays A, B and C of the present invention are located at a predetermined location so that the burst event 26 will occur within the array. For example, an array may have each transmitter 10 separated by a distance of approximately 2,450 meters with the burst event 26 occurring at the center of the array at an altitude of approximately 1000 meters.

It is important that the arrays of transmitters 10 and receivers 18 and 20 are located such that the burst event 26 will occur within the array. If the transmitters 10 and receivers 18 and 20 are too far apart, the signal reflected by the components will be attenuated to a point where the receivers 18 and 20 cannot receive a strong enough reflected signal to produce an appropriate proximal or distal signal to the processor 22 (FIG. 1) for proper tracking. In addition and more importantly, there will be a loss of accuracy due to geometric dilution of position.

Figure 3:
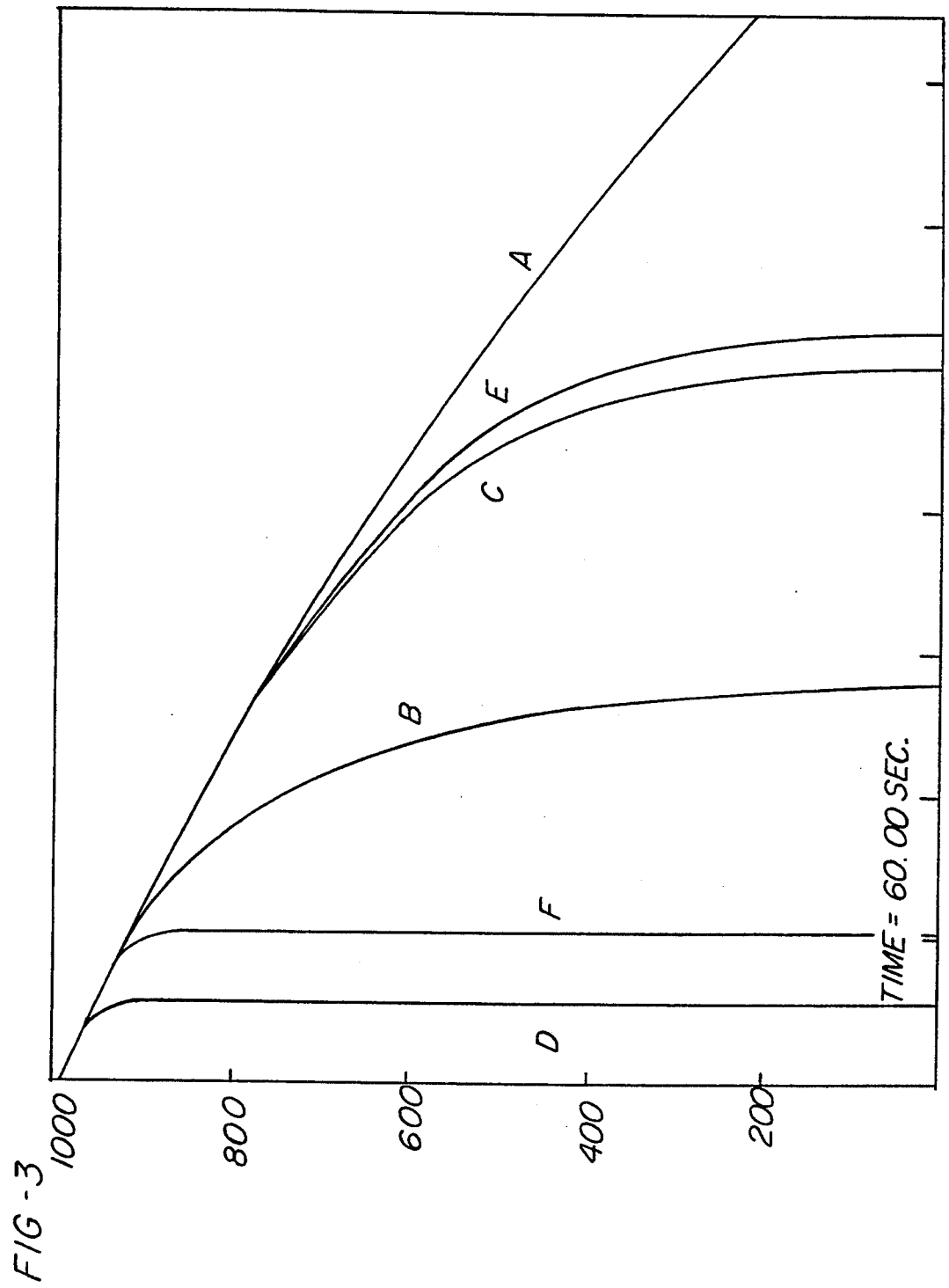
FIG. 3 is a graph of flight paths of several components falling.

Referring to FIG. 3. when the munition is burst, it will separate into a plurality of components, such as the ogive, the base plate, sub-munitions and end plates and wads. For purposes of explanation, only six components have been selected. Each of the six components, A, B, C, D, E, and F, has a different drag and acceleration. For example, the nose cone or ogive A of the munition has an acceleration forward of 38 m/sec and the more massive components C and E are decelerating at a rate of 12 m/sec.

In the example the burst event takes place at time=0 and the six components fall to the ground. Each of the components A, B, C, D, E and F has a different aerodynamic characteristic with drag chutes on the main components C and E, adding to the drag force. These drag forces result in a two dimensional flight path of each component as shown in FIG. 3. Wads D & F decelerate quickly.

The following is a detailed discussion of the software which is used by the processor 22 to process the signals received from the proximal 18 and distal receivers.

Generally, the signals are first received as a time domain waveform. The processor converts the signals from each receiver, proximal and distal, which is in a time domain waveform, to a digital spectrum by means of a fast Fourier transform (FFT). The spectra of each receiver are compared to determine the two and three dimensional positions of the components and a tracking signal for each of a selected number of components is produced.

Figure 4:
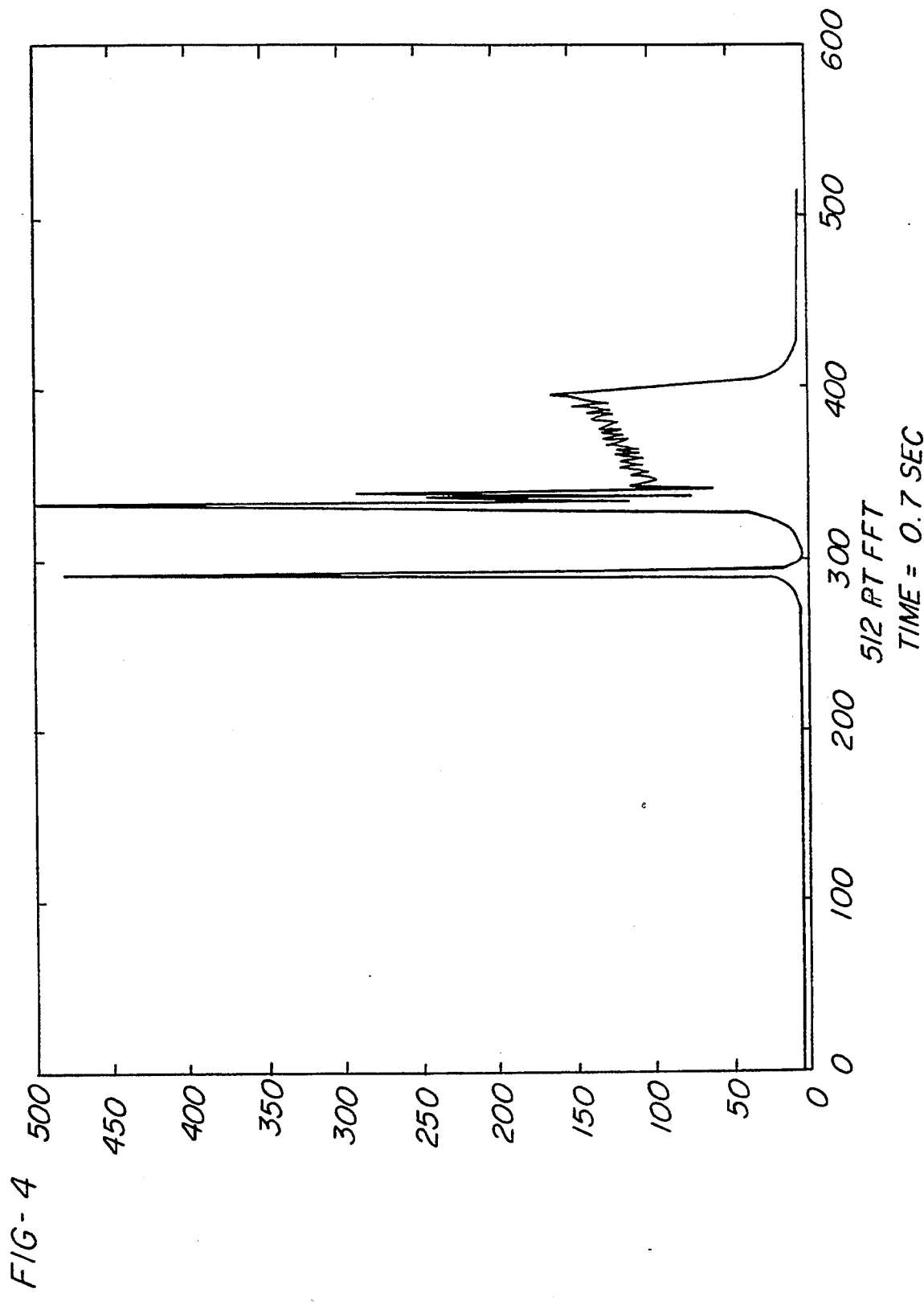
FIG. 4 is a spectrum of the Doppler signals produced at a receiver.

Initially the data from the distal and proximal receivers is converted into a spectrum as shown in FIG. 4 via a 512 point fast Fourier transform (FFT). The FFT is performed in 4.2 milliseconds. The program first identifies the lines in the FFT spectrum, FIG. 4, by rectifying the FFT spectrum. The rectified spectrum for each receiver is divided into two halves, a right half and a left half. The left half, being bin 1 to bin 255 of the FFT spectrum, represents the positive Doppler frequencies which indicates that components are moving away from the receiver. The right half, being bin 256 to bin 511, represents the negative Doppler frequencies which indicates that components are moving towards the receiver.

In FIG. 4, it is apparent that no objects are moving away from the receiver since there are no energy peaks in the left half of the spectrum, that is, below bin 256 of the spectrum. In the right half of the spectrum it is apparent that several objects are moving towards the receiver since several energy peaks are shown.

The first clean peak is the most rapidly approaching object, the nose cone. The nose cone is accelerated by the ejection charge of the burst at a rate of approximately 270 meters per second. The next group of energy peaks that are in close relation represents the components or submunitions and the base plate of the munition. These components are decelerated, due to drag forces, to a rate of approximately 220 meters per second. The next group of energy peaks is the jagged plateau which represent the light wads or components from the munition. These wads are decelerated, due to drag forces, to a rate of 130 meters per second.

The drag forces on the wads decrease quadratically as the velocity decreases thereby explaining why the peaks on the right side of the plateau have higher energy amplitudes than the peaks on the left side of the plateau.

Next, the program defines a window of frequencies by looping out and sorts through all of the bins of the FFT and identifies the peaks of the FFT. The program returns from the loop with the identified peaks. The program processes the data from the spectrum to determine the tangential velocity, which is the velocity of a component at a right angle to the line of sight.

Figure 5:
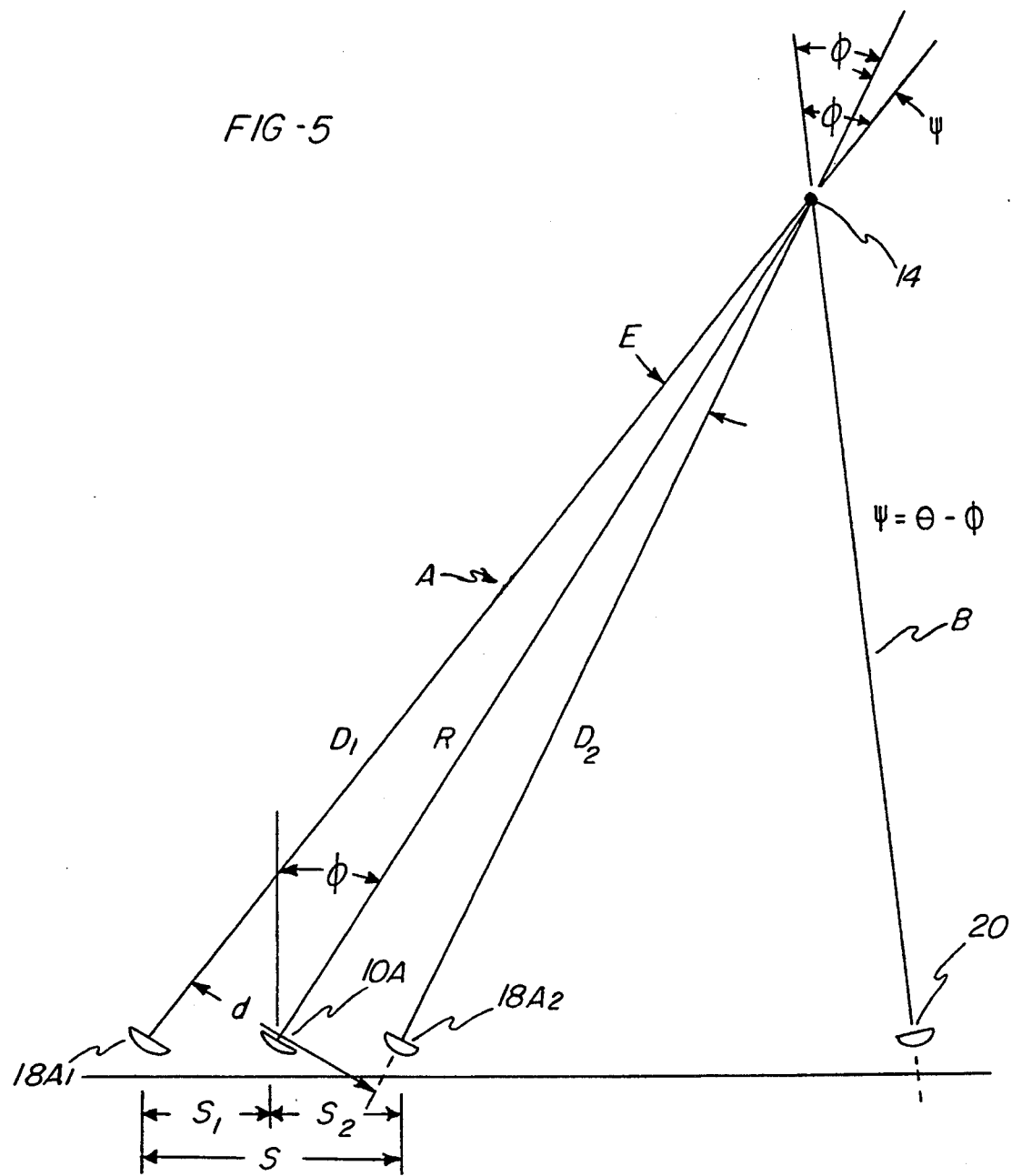
FIG. 5 is a geometric representation of the frequency signals being reflected by a component.

Referring to FIG. 5, two proximal receivers 18A in a single plane will observe the same Doppler for each object, which is a rate of change of departure from the transmitter, 10A. The slight difference between the Dopplers of the two proximal 18A receivers is a measure of the tangential velocity with respect to the transmitter 10A. This difference is attenuated in magnitude by the difference in the angle between the two dopplers viewing the reflecting component 14.

It should be noted that the Doppler of the present invention is not the conventional radar range of transmitter/receiver to component to transmitter/receiver but a transmitter to component to receiver radar range. Therefore the rate of change in the signal from the transmitter R to the component and back to the two proximal 18A receivers, via D1 or D2, permits the determination of the tangential velocity.

The proximately receivers 18A are spaced approximately equal distances S1 and S2 from the transmitter 10A. The angle separating the proximal receivers 18A from the point of view of the component 14 is so small that it may be assumed that D1 and D2 are parallel to R. With the angle $\epsilon$ being small the length of D1 and D2 can be found by:

$$D1 = R + S1 \sin \phi$$

$$D2 = R - S2 \sin \phi$$

The rate of change P1 and P2 of the two Dopplers D1 and D2 can be determined by:

$$P1 = R + D1 = 2R + S1 \sin \phi$$

$$P2 = R + D2 = 2R - S2 \sin \phi$$

The tangential velocity Vt of the component 14 is determined by:

$$V_r = R \frac{d\phi}{dt} = V \sin \psi$$

Next the data from the determination of the tangential velocity is used to determine the radial velocity $V_r$ by:

$$V_r = \frac{dR}{dt} = V \cos \psi$$

Given the two orthogonal components, that is the tangential $V_t$ and radial $V_r$ velocities, with respect to the proximal receivers, the radial velocity of the component toward another point, such as the distal receiver 20 can be predicted.

The velocity with respect to the distal receiver 10 is determined by first determining the path length from the distal receiver 20 to the object 14 (B) to the proximal receiver array 18 (A).

Path A—A = 2A

Path A—B = A + B

Path B—B = 2A + 2B − 2A

Path B—B = 2B

The Doppler received at the distal receiver 20 observes a rate of change of Path A—B. From the above equation of the tangential velocity $V_t$ and the radial Velocity $V_r$ it is determined that the rate change R of a component with respect to the proximal array and the distal receiver is equal to:

$$R_A = v \cos(\theta - \phi_A)$$

$$R_B = v \cos(\theta - \phi_B)$$

With further processing and calculation the pseudo-vertical $V_v$ and horizontal velocity $V_H$ of a component are represented by:

$$V_v = V \cos \theta$$

$$V_H = V \sin \theta$$

The computer transforms the velocity data and the position data of the selected components into drive signals for each of the KTMs used to track several of the components. The KTMs will track the path of its assigned component. The tracking of the components provides valuable data for the study of the reactions of a munition burst.

Each KTM tracking device has a field of view within which the tracking must occur. The calculation errors from the estimations by the program must be minimal to insure the component is tracked properly. The results of the present invention is that if there is a plurality of components from a munition burst, of N, it is necessary only to conduct N calculation to derive the velocity and by integration with respect to time their position. In the past it was assumed that any combination of the Doppler lines observed at the various receivers would require N cubed calculations to obtain three-dimensional positions, including those of non-existing objects called "ghosts."

A deghosting function is performed on the spectrum to prevent any errors due to cross overs of the Dopplers of the components. Three different matchings are performed to insure any cross overs of the Dopplers do not cause large errors in the calculation.

The first match is performed by arranging the lines in a first and second spectrums in ascending order of frequency and matching the order number of each. The second match pairs up the lines of the first spectrum with the lines in second spectrum. The energies of the match is compared and the largest energy line of the two spectrums is used. The third match is the pairing of the lines of the second spectrum with the lines of the first spectrum with the energies of the match again compare to determine the largest energy line. Finally the energies of all of the matches are compared to pick the best match.

This matching takes place for the proximal pairs, the proximal to distal receiver and the distal receivers to the correlating transmitter array. Once the lines of the proximal spectrum are matched up with the lines of the distal spectrum the tangential velocity of the components with respect to the distal 10 receiver is determined as stated above.

While the method and apparatus herein described constitutes a preferred embodiment, it is to be understood that the invention is not limited to this precise method and form of apparatus, and that changes may be made without departing from the scope of this invention, which is defined in the appended claims.

What is claimed is:

1. A method of tracking a multiple of components, including submunitions and debris, of a munition which is burst apart above the ground, the method comprising the steps of;

determining a probable location of the burst event;

placing a plurality of transmitters in spaced apart predetermined locations surrounding the probable burst event location, each of the transmitters operating at a different frequency;

placing a plurality of proximal receivers at predetermined locations in the vicinity of each transmitter;

placing a plurality of distal receivers at predetermined locations and predetermined distances from each transmitter on either side of a line from the transmitter to the probable burst event location;

comparing the signals received at both the proximal and the distal receivers associated with each transmitter with the radiated frequency of that transmitter to obtain a signal signature representing the velocity of each component of the munition relative to each receiver;

analyzing the signal signatures from each receiver to identify the position and path of each component;

selecting certain of the components for tracking by a plurality of tracking devices;

assigning one tracking device to each of the multiple components; and providing tracking data to each of the tracking devices.

2. The method of claim 1 further comprising the steps of:

measuring the radial velocity of the multiple components with respect to each transmitter from the signals received from the proximal receivers;

calculating the tangential velocity of the multiple components from the radial velocity;

calculating the radial velocity at the distal receivers from the tangential velocity; and calculating the position of the multiple components based upon the tangential and radial velocities of each multiple component.

3. The method according to claim 1 further comprising the steps of;

generating the coordinates of each multiple component;

calculating the distance of each multiple component from each radar transmitter resulting as positional data; and adding to the positional data of each multiple component the distance of each component to each receiver.

4. The method according to claim 3 further comprising the step of; and obtaining an time domain waveform from each distal and proximal receiver for each multiple component.

5. The method according to claim 4 further comprising the steps of;

converting the time domain waveform into a digital signal; and converting the digital time domain waveform signals into a spectrum.

6. The method according to claim 5 further comprising the steps of;

analyzing the spectrum from the proximal and distal receivers;

processing the spectrums to determine the velocity of the selected multiple components;

predicting the path each multiple components will take; and periodically repeating the above process of analyzing, processing and predicting to adjust for any changes in the path of each multiple component.

7. A method of tracking a plurality of components in three dimensions, including submunitions and debris, of a munition which is burst apart above the ground, the method comprising the steps of;

placing three arrays, each including a transmitter, at least two pairs of proximal receivers, and at least two distal receivers, in triangular relation such that the transmitters define three points of the triangle and three linear sides of the triangle;

placing the two pairs of proximal receivers around their associated transmitter, one pair of proximal receivers lying along one plane defined by one associated side of the triangle with one proximal receiver on each side of the transmitter and the other pair of proximal receivers lying along another plane defined by the other associated side of the triangle with one proximal receiver on each side of the transmitter;

placing each of the distal receivers along one side of the triangle less than half way between the distal receiver's associated transmitter and other transmitter defining that side of the triangle;

transmitting a different frequency signal from each of the transmitters towards the burst event of the munition;

receiving signals reflected by the components at the associated proximal and distal receivers in each array;

processing the reflected signals for determining the position of a plurality of components;

producing tracking signals from the processed signals for determining the path the plurality of components will follow; and tracking the components along the paths of the components with a plurality of tracking devices.

* * * * *